3 Sheets—Sheet 1.

S. M. FIELD & W. HALKYARD.

Assignors to H. A. CHURCH.

MACHINE FOR MAKING ROLLER CHAIN UNITS.

No. 10,326. Reissued May 15, 1883.

WITNESSES:

J. H. Boma

C. H. Luther Jr.

INVENTORS

Silas M. Field

William Halkyard by Joseph A. Miller & Co

Attys.

N. PETERS, Photo-Lithographer, Washington, D. C.

3 Sheets—Sheet 2.

S. M. FIELD & W. HALKYARD.

Assignors to H. A. CHURCH.

MACHINE FOR MAKING ROLLER CHAIN UNITS.

No. 10,326. Reissued May 15, 1883.

WITNESSES:

J. H. Bowe

E. H. Leuthusser

INVENTOR:

Silas M. Field and William Halkyard, by Joseph A. Millard

Atty.

N. PETERS, Photo-Lithographer, Washington, D. C.

S. M. FIELD & W. HALKYARD.
Assignors to H. A. CHURCH.
MACHINE FOR MAKING ROLLER CHAIN UNITS,
No. 10,326. Reissued May 15, 1883.
Fig. 3.
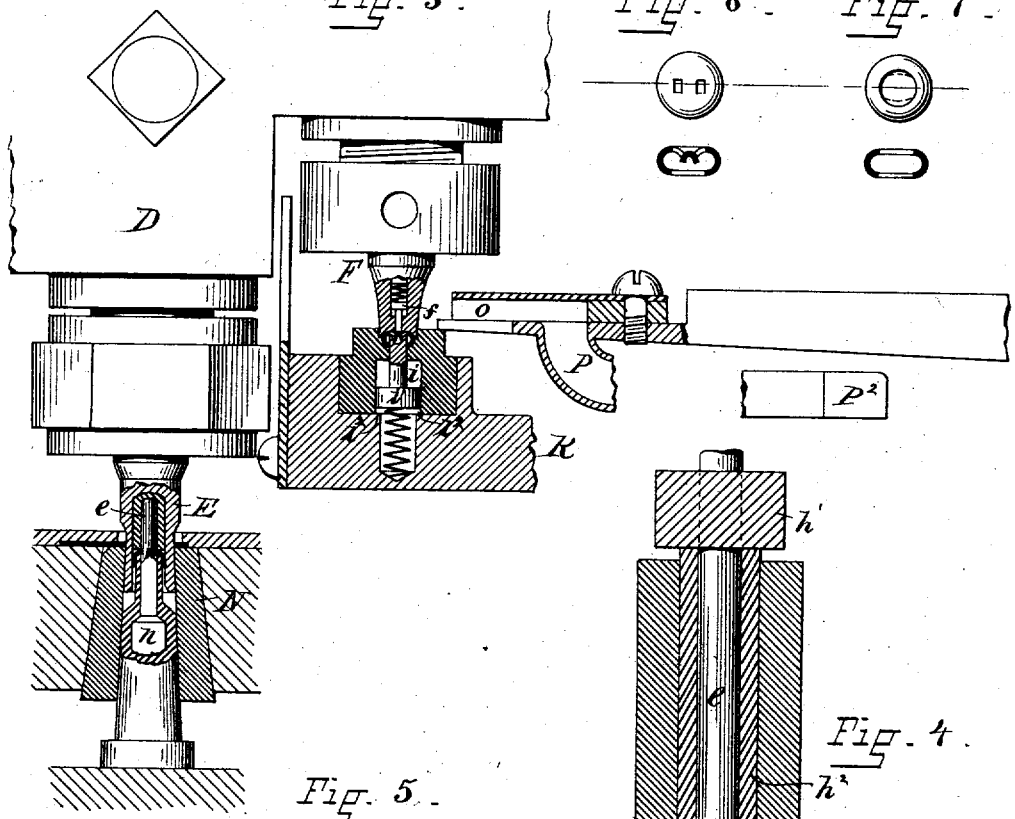
Fig. 6.
Fig. 7.
Fig. 4.
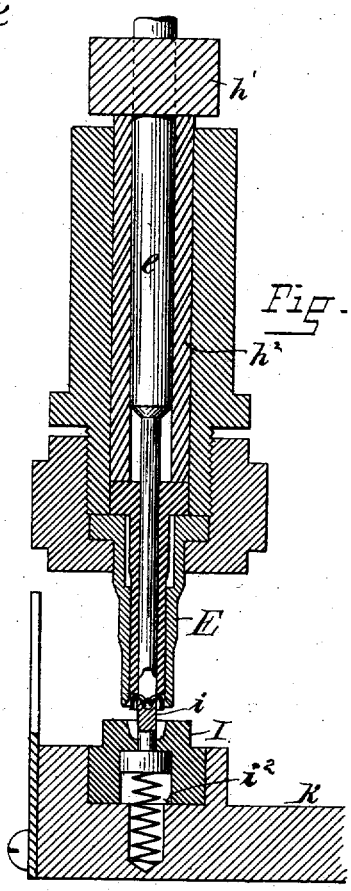
Fig. 5.
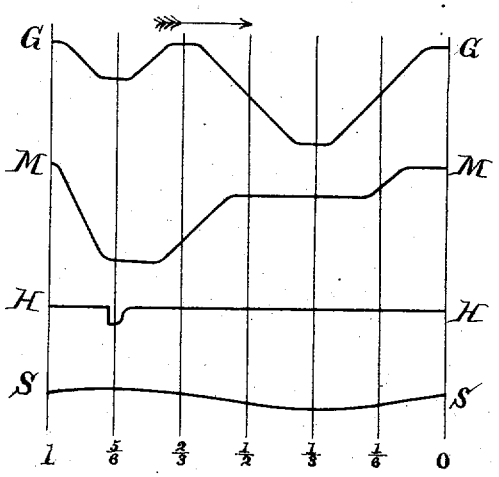
WITNESSES:
J. H. Boons
C. H. Leuthusser
INVENTOR:
Silas M. Field
and William Halkyard
by Joseph A. Miller & Co
Attys.
N. PETERS, Photo-Lithographer, Washington, D. C.

UNITED STATES PATENT OFFICE.

SILAS M. FIELD AND WILLIAM HALKYARD, OF PROVIDENCE, RHODE ISLAND, ASSIGNORS TO HENRY A. CHURCH, OF SAME PLACE.

MACHINE FOR MAKING ROLLER-CHAIN UNITS.

SPECIFICATION forming part of Reissued Letters Patent No. 10,326, dated May 15, 1883.

Original No. 266,982, dated November 7, 1882. Application for reissue filed April 12, 1883.

*To all whom it may concern:*

Be it known that we, SILAS M. FIELD and WILLIAM HALKYARD, both of the city and county of Providence, and State of Rhode Island, have invented a new and useful Improvement in Machines for Making Roller-Chain Units; and we hereby declare that the following is a full, clear, and exact description of the same, reference being had to the accompanying drawings, forming part of this specification.

This invention has reference to improvements in machines for making the rings or units of roller-chains—that is to say, of that class of ornamental chains consisting of a large number of rings placed side by side, overlapping endwise, one set of rings or units over the other, and secured together by wires or staples.

The invention consists in the peculiar and novel construction of the dies and plungers, and means for operating the same, and the combination of the parts, as will be more fully set forth hereinafter.

Figure 1:
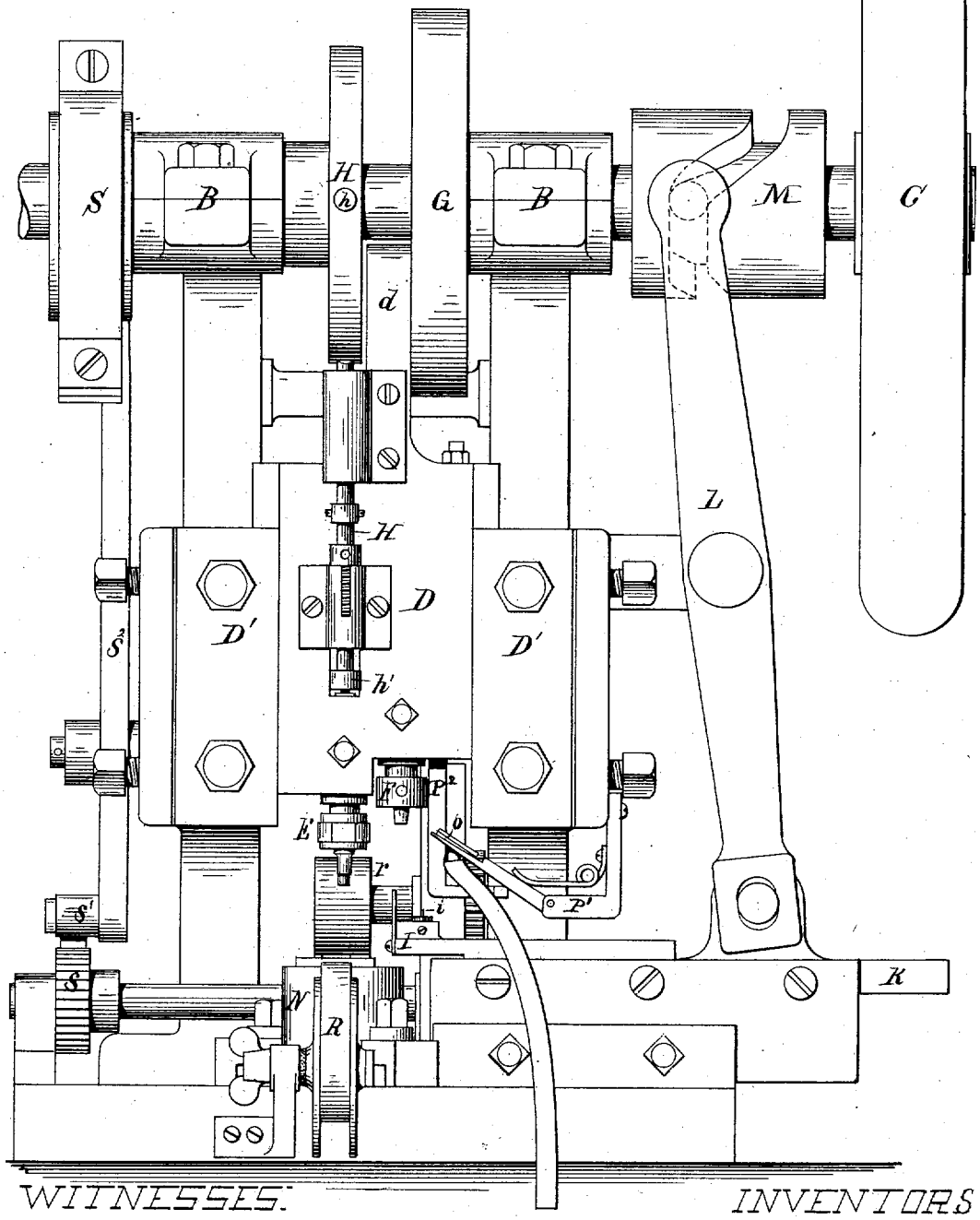
Figure 2:
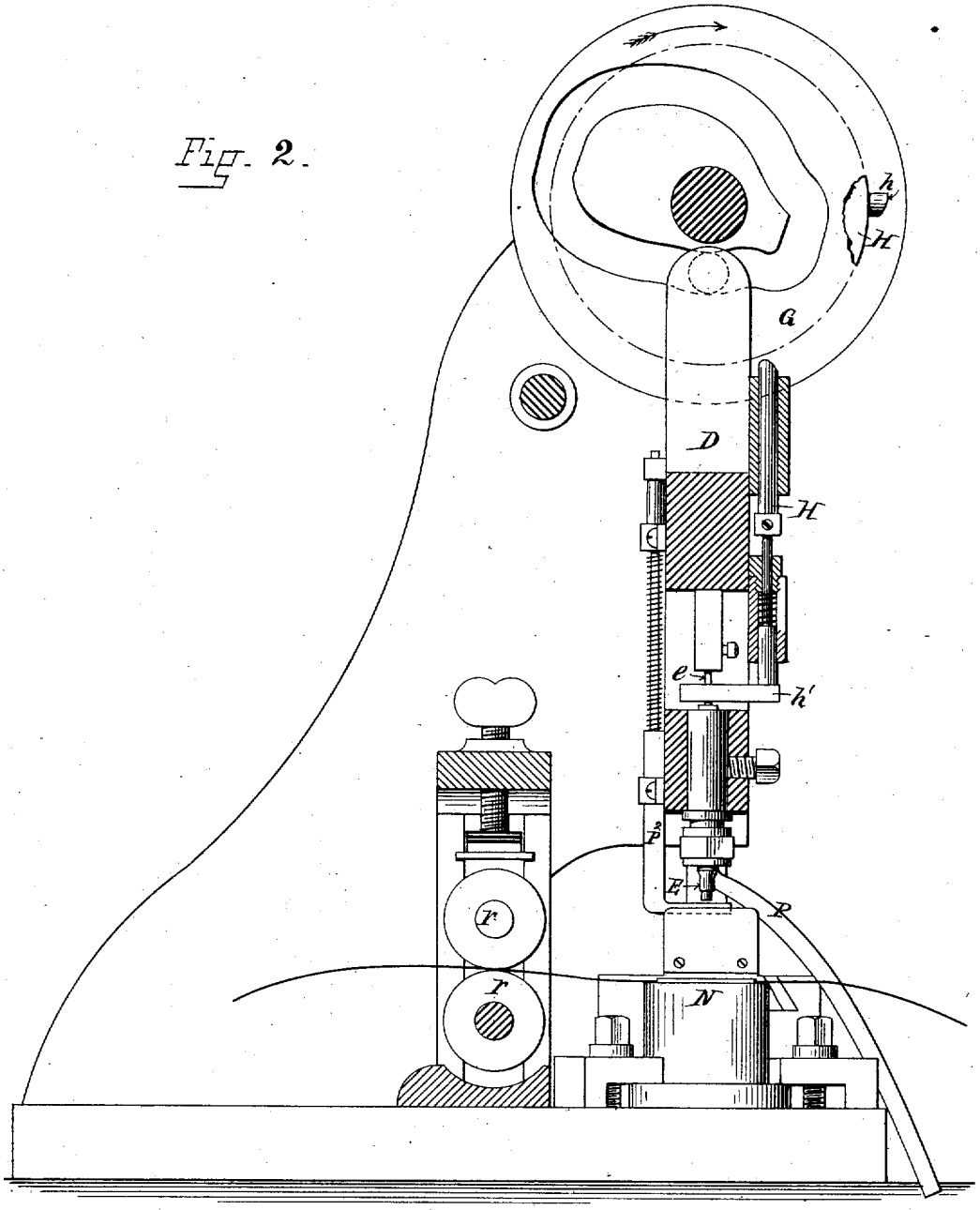

Figure 1 is a front view of the machine, showing the relative position of all the parts. Fig. 2 is a vertical sectional view of the machine through the axial line of the cutting-out punch. Fig. 3 is an enlarged view of the cutting-out punch and the closing-punch, the punches and co-operating parts being shown in section, both the punches being shown at the limit of their downward motion. Fig. 4 is an enlarged sectional view through the axis of the cutting-punch, showing the closing-die also in section under the cutting-die to receive the collet or unit. Fig. 5 is a diagram illustrating the movements of the operative parts produced by the cams, and their relation to each other. Fig. 6 is a view and section of one of the collets, being one of the units forming the edge of the chain; and Fig. 7 is a view and section of one of the units or rings.

In the drawings, A is the driving-shaft, from which motion is imparted to all the operative parts by means of cams and an eccentric. The shaft A turns in the bearings B B.

C is a fly-wheel secured to the main shaft. A driving-pulley is placed on the other end of the shaft, but is not shown in the drawings.

D is a reciprocating block, sliding in the ways D′ D′. The cutting-out punch E and the bending-plunger F are both secured to the block D and reciprocate with the same. The block D is reciprocated by means of the cam G on the shaft A, the extension *d* of the block D entering the groove in the cam G.

H is a disk secured to the shaft A, and provided with the cam-stud *h*, by which the stripper-rod H′ is operated, which, by means of the arm *h′*, operates the sleeve $h^2$, and thereby pushes the partly-formed collet or unit from the cutting-punch E.

I is the anvil. (Shown enlarged in Fig. 4.) It is mounted on the horizontal slide K, by which it is placed alternately under the cutter-punch E and the upsetting-punch F. The slide K is moved laterally by the centrally-pivoted arm L, the upper end of which engages with the cam M.

Within the sleeve $h^2$ the punch *e* is placed, said punch being provided with two projections for cutting the two holes in the collet shown in Fig. 6, but when the rings or units shown in Fig. 7 are being made this punch is removed and a plain punch for punching the central hole is substituted. The anvil I is provided with a spring-pressed pin, *i*, which is provided with a base, *i′*, under which is a seat, $i^2$. The pin *i* enters the hole in the unit or collet, but yields to the pressure of the plunger F, so that the base *i′* descends and rests upon the seat $i^2$, in which position the pin *i* forms a part of the anvil-die, to keep the inner edge of the unit in proper shape. When the pressure is relieved the spring reacts and raises the collet or unit above the anvil. A motion of the slide K places the unit or collet on the fork O of the delivery-channel P, which, with the fork O, is hinged to the bracket P′. The plunger F is also provided with the spring-pressed pin *f*, by which the unit is removed from the plunger when the latter rises.

The cutter-die N is fixed in the frame of the machine, and is provided with the former *n*, over the end of which the unit or collet is formed. The strip of metal from which the collets or units are to be punched is supplied from the roll R, placed between two disks, which are mounted on an arbor and held by a thumb-screw, as is shown in Fig. 1. The strip of metal is drawn under the cutter by the rolls *r r*, which are turned by means of the ratchet-wheel *s*, operated by the pawl *s'*, placed on the arm $s^2$, which is connected with the eccentric S on the driving-shaft A.

In Fig. 5 the motions imparted to the devices are indicated by lines, G being the motion imparted by the cam G to the cutter-die and former-plunger; M, the motion imparted to the anvil by the cam M; H, the motion imparted to the stripper-sleeve $h^2$ by the cam H, and S the motion imparted by the eccentric S. The receiving-fork O and delivery-channel P are connected to the reciprocating-block D by the spring-pressed rod $P^2$, so that the end of the fork reciprocates with the same.

Having thus described the various parts of our improved machine, we will now more fully describe the operation of the same.

A strip of metal suitable for the purpose is placed between the disks R in the form of a spiral, or it may be otherwise supplied to the machine, the end being placed between the rolls *r r*, such rolls being brought together by the set-screws shown in Fig. 2, to firmly hold the strip. The machine is now set in motion, the block D descends, and the cutter E cuts a circular or oval blank from the strip, which is forced over the former *n* in the die N, and is bent. When a collet is made the punch *e* descends and cuts the two holes into the same, and when a ring or unit is made a similar punch cuts a round or an oval hole into the same. (We would here state that the collets and units may be made either round or oval, and that either a round or an oval hole may be punched into either a round or an oval unit.) The cutter E now rises, carrying the partly-formed unit or collet with it. The anvil I is moved under the cutter E, the spring-pressed pin *i* projecting to receive the partly-formed unit or collet. As soon as the pin *i* reaches a position in line with the punch E, said punch, owing to the shape of the cam which operates slide D, descends slightly, so as to surround the upper end of the pin and guide thereupon the unfinished collet, which is now pushed out of the cutter by the stripper-sleeve $h^2$, which in Fig. 4 is shown in its lowermost position after having driven the collet downward, and when the collet has been thus deposited upon the pin *i* the punch ascends to leave the pin free to move laterally, and the anvil is now moved under the bending-punch F, which descends and bends the unit or collet, as is shown in Fig. 3, while the cutter E also cuts and partly bends another blank. As the bending-punch rises the slide K and anvil I move to the right and the bent unit or collet is delivered to the fork O, which, rising with the punches and the block D, delivers the same through the channel P. The rolls *r r*, moved by the eccentric S, through the arm $s^2$, the pawl *s'*, and the ratchet *s*, feed the metal strip to supply the material for the blanks.

By the peculiar construction of the machine a blank is cut, bent, finished, and delivered at each revolution of the main driving-shaft.

We are aware that machines for making eyelets have been provided with a block having two plungers connected with one reciprocating block, and that such plungers, while operating simultaneously, acted successively on the blanks to cut and bend the same. We are also aware that such machines have, before our present invention, been used for making the units of roller-chains, and we do not therefore claim the use of the elements, broadly.

Having thus described our invention, we claim as new and desire to secure by Letters Patent—

1. The combination, with the anvil having the collet-carrying pin *i*, of the hinged fork O and channel P, mechanism for moving the anvil laterally into position for the fork to embrace said pin, and devices for raising said fork, substantially as and for the purpose set forth.

2. The combination, with the slide D, carrying the plungers E and F, and the sliding anvil I, of the cam G, constructed to move the slide downward to cut a blank for the collet, thence upward to allow the anvil to pass under the plunger E, thence downward to deposit the collet on the anvil, and again upward before descending to cut another blank, as described.

3. The combination, with the plunger E, of the forked punch *e*, constructed to pierce the blank to form two holes and bend the metal inward, as described.

SILAS M. FIELD.
WILLIAM HALKYARD.

Witnesses:
M. F. BLIGH,
J. A. MILLER, JR.